United States Patent [19]

van der Linde et al.

[11] 4,072,662

[45] Feb. 7, 1978

[54] POLYESTERS

[75] Inventors: Robert van der Linde; Gerardus Franciscus Meijerink; Johan Rietberg, all of Zwolle, Netherlands

[73] Assignee: Internationale Octrooi Maatschappij "Octropa" B.V., Rotterdam, Netherlands

[21] Appl. No.: 703,024

[22] Filed: July 6, 1976

[30] Foreign Application Priority Data

July 4, 1975 United Kingdom ............... 28310/75

[51] Int. Cl.$^2$ ............................................. C08G 63/12
[52] U.S. Cl. ..................................... 260/75 R; 260/21; 260/22 D; 260/850; 427/385 R; 428/480
[58] Field of Search ..................... 260/21, 22 D, 75 R

[56] References Cited

U.S. PATENT DOCUMENTS

| 3,530,082 | 9/1970 | O'Gorman et al. | 260/22 D |
|---|---|---|---|
| 3,714,091 | 1/1973 | Lasher | 260/21 |
| 3,741,937 | 6/1973 | Ehring et al. | 260/76 |
| 3,893,959 | 7/1975 | Layman | 260/22 D |

Primary Examiner—Lucille M. Phynes
Attorney, Agent, or Firm—Barry Kramer

[57] ABSTRACT

The invention provides novel polyesters based on 100 – 75 equivalent percent of a phthalic acid, 0 – 25 equivalent percent of an aliphatic dicarboxylic acid and 150 – 225 equivalent percent of a $C_5$ – $C_{12}$ diol. The polyesters can be admixed with amino resins and an acid catalyst to form a coating composition which can be stoved into a hard tough coating.

7 Claims, No Drawings

POLYESTERS

This invention relates to polyesters and more in particular to non-drying polyesters or alkyd resins and their use in high-solids stoving coating compositions by admixing them with amino resins, e.g. melamine-formaldehyde or urea-formaldehyde resins.

In the industry there is a growing tendency to use surface-coating compositions with a very low percentage of (or even without) volatile solvents, because of the well-known disadvantages connected with the use of organic solvents.

Melamine-formaldehyde and urea-formaldehyde-alkyl based compositions are known to yield excellent tough coatings and it has been suggested to develop high-solids coating systems, i.e. compositions containing only 20% by weight or less of organic solvent based on the total coating composition.

Consequently, low-viscosity reactive polyester or alkyd resins have been developed, mainly based on aromatic and aliphatic dicarboxylic acids and excess glycol, mainly consisting of ethylene glycol and propylene glycol. When these polyester or alkyd resins were worked into melamine-based coating compositions these compositions still required, depending on whether a cold or hot spraying technique was used, 15–25% or 5–10% of organic solvent, respectively, such as butanol, butyl acetate, butoxyethyl acetate, to obtain sprayable compositions. The coatings obtained with these compositions often show blisters or pockmarks upon stoving and usually objectionable decomposition vapours develop in the stoving oven. Incorporation of higher percentages of pigment whilst retaining good rheological properties is also frequently difficult.

The invention provides novel reactive non-drying polyesters which can be worked into amino resin based high-solids coating systems which require even when pigmented with 100% by weight of titanium dioxide for hot-spraying techniques at 80° C, no solvent or only a minor amount (3% by weight of the total composition as a maximum) of solvent and for cold-spraying techniques 8–12% of solvent, and which furthermore do not show all of the disadvantages set out above. Suitable solvents are e.g. butyl acetate, n-butanol, methyl isobutyl ketone, xylene, Cellosolve acetate (ethyl glycol acetate).

The novel low-viscosity and low-molecular-weight polyester or alkyd resins are based on 100–75 equivalent percent of a phthalic acid, 0–25 equivalent percent of an aliphatic dicarboxylic acid containing 4 to 40 carbon atoms and 150–225, preferably 175–210 equivalent percent based on total carboxylic acid of a diol component, the molecules of which contain at least five carbon atoms, preferably a straight chain diol. These novel alkyd resins have average molecular weights of 350–1000, preferably below 800, a viscosity at 20° C below 4000 Poise, preferably below 2000 Poise (measured in the Emila rotation viscosimeter using spindle no. 100), a hydroxy value of 130–400, preferably of 150–300, and generally an acid value below 10, preferably below 5. For particular applications higher acid values are desirable.

A "phthalic acid" as used herein is to be understood to mean orthophthalic acid, its anhydride, terephthalic acid, isophthalic acid, a hydrogenated derivative of said phthalic acid, as tetrahydro- and hexahydrophthalic acid or a homologue thereof, such as e.g. 3-methyl hexahydrophthalic acid. Isophthalic acid is preferred.

An "aliphatic dicarboxylic acid" as used herein to be understood to mean a straight or branched chain $C_4$–$C_{40}$ dicarboxylic acid such as e.g. succinic acid, adipic acid, bacic acid, azelaic acid, suberic acid, decane dicarboxylic acid, etc. but also higher dicarboxylic acids as e.g. dimeric fatty acids as dioleic acid, dilinoleic acid, and mixtures thereof.

A "diol containing at least 5 carbon atoms in the molecule" as used herein is to be understood to mean a diol containing up to 12 carbon atoms in a straight chain, having preferably primary hydroxyl groups and optionally containing other groups, such as ester or ether groups. Examples are e.g. pentanediol-1,5, hexanediol-1,6, heptanediol-1,7 and higher homologues thereof. Branched chain diols optionally containing ether or ester groups may partially replace the straight chain diol. Up to 80, preferably up to 70 equivalent percent, of the diol may consist of one or more branched chain diols.

Suitable branched chain diols are e.g. 2,2,4-trimethylpentanediol-1,3, 2,2,4-trimethylhexanediol-1,6, 2-ethyl propanediol-1,3 and ether and ester diols like e.g. the hydroxypivalic acid ester of neopentyl glycol (1:1), often referred to as Esterdiol 204 in conjunction with its molecular weight. Branched chain diols containing only methyl substituents are preferred.

The novel polyesters or alkyds can be prepared by reacting the above ingredients or functional derivatives thereof, e.g. lower ($C_1$–$C_5$) alkyl ester, in the indicated proportions by methods known in the art, e.g. by esterification of a reaction mixture consisting of diol and dicarboxylic acid, whilst removing water of reaction as it is formed. Water of reaction collected is a suitable means of following progress of the reaction. Acid value, hydroxyl value, viscosity at 20° C (measured with the Emila rotation viscosimeter, using spindle no. 100) and solids content (determined by heating a 1 gram sample in a thin layer for 30 minutes at 150° C) are determined at the end of the process.

The diol component of the novel alkyd resin may consist entirely of straight chain diols in which the hydroxyl groups are separated by 5 to 12 methylene groups, but for imparting certain properties such as e.g. hardness to the final coating, it may be desirable to use a mixture of diols which consists of up to 80, preferably up to 70 equivalent percent, of a diol having at least one alkyl branching. For certain applications the incorporation even of up to 100 equivalent percent of an esterdiol is preferred.

According to the present invention the non-drying polyester is then worked into a high-solids coating system, usually by first milling a pigment paste with the polyester. The pigment is present in quantities of up to 200% by weight of the polyester. Into the pigment paste such an amount of methoxy methyl amino resin, such as hexamethoxy methyl melamine, e.g. Cymel 301 (ex American Cyanamid Corp.) or Resimene type 755 (ex Monsanto Corp.) or methoxy methyl urea is incorporated that the weight ratio of polyester to melamine resin is between 50:50 and 80:20, and an amount of 0.1 to 1%, based on total binding agent (melamine resin together with alkyd resin) of an acid catalyst, e.g. a sulphonic acid such as paratoluene sulphonic acid or dodecyl benzene sulphonic acid or monobutyl phosphate, butyl half ester or tetrachlorophthalic acid or epoxy-blocked sulphonic acid, and, depending on the manner of application of the coating film, a small amount of solvent which usually is a $C_3$-$C_7$ alcohol, ketone, ester, ether, hydrocarbon or chlorinated hydrocarbon.

Other optional constituents like fillers, flow control agents, thixotropic agents, silicon oil etc. may also be incorporated. Instead of a melamine resin a ureaformaldehyde resin or a benzoguanamine resin can be used.

The high-solids system thus obtained is then hot-sprayed, cold-sprayed, electrostatically sprayed, brushed, rolled or otherwise applied in a thin coating upon objects, and the coating is then stoved in an oven at temperatures of 80°-300° C, yielding objects, like metal strips, car parts, domestic appliances, the surface of which is fully or partially covered by a coating according to the invention, i.e. by a hard, tough, glossy film of excellent quality. The stoving residue when 100% pigment is used based on total resin is usually above 85%.

The following examples serve to illustrate the invention.

EXAMPLES I - IX

Preparation of polyester resins

Into a 1 liter flask equipped with a mechanical stirrer, a water-cooled condenser and a thermometer, the appropriate amounts of a phthalic acid and optionally the aliphatic dicarboxylic acid together with the higher diol or diols as indicated in Table I were introduced and the reaction mixture was heated in a nitrogen atmosphere to 175° C, at which temperature distillation of water commenced. The temperature of the reaction mixture was slowly increased to a maximum of 215° C in such a way as to maintain a steady rate of distillation of water of reaction. When about the theoretical amount of water equalling in moles the number of equivalents of carboxylic acid had been collected, the heating was discontinued and acid value (a.v.), hydroxyl value, viscosity (n) (by means of an Emila rotation viscosimeter using spindle no. 100) and solids content (by heating a 1 gram sample in a thin layer to 150° C for 30 minutes) were determined. Composition and characteristics are tabulated below. (Table I).

Preparation and application of paints 1-9

65.5 g of the alkyd resin, calculated as solid material based on the solid matter content given above, were milled together with 100 g stabilized titanium dioxide pigment (Kronos RN 59; ex Titan GmbH) on a triple roll mill. Then 40 g hydroxymethyl melamine derivative (Cymel 301, ex American Cyanamid Corp.) and 0.5 g dodecyl benzene sulphonic acid were incorporated into the pigment paste. The paint thus obtained was applied as such on mild steel panels of 0.5 mm thickness by means of a Bird Film applicator BA 25 in a thickness of 50-60 microns and the coating stoved in an oven at 180° C for 15 minutes. The coatings thus obtained were tested by standardized procedures as to impact strength according to Erichsen (Apparatus 226), Erichsen slow penetration according to DIN 53156, bend test angle of 180°, hardness according to Konig (I.S.O. 1522), gloss according to Gardner at 20° and 60° (I.S.O. 2813), levelling judged optically, general appearance of surface, visual gloss and adhesion measured by a cross cut test according to I.S.O. 2409. The results are tabulated in Table II. Similar results were obtained when the "dry paints" described above were sprayed on steel panels at 80° C or diluted to a solids content of approximately 90% by means of butoxy-ethyl acetate:butyl acetate (1:1 $^v/v$) and sprayed at room temperature.

TABLE I

| | Resin Composition (moles) | | | | | | | | | | | Characteristics | | | |
|---|---|---|---|---|---|---|---|---|---|---|---|---|---|---|---|
| Ex. | Terephthalic acid | Isophthalic acid | Phthalic acid | Adipic acid | Pentane diol 1,5 | Hexane diol 1,6 | 2,2,4-Trimethyl pentane diol - 1,3 | 2,2-phenyl methyl propane diol - 1,3 | 2,2-ethyl butyl propane diol 1,3 | 2,2-methyl propyl propane diol 1,3 | Ester diol 204 | AV | OH value | n 20° C (P) | solid matter cont. % |
| 1 | 1.5 | | | | | | | | | | 3.15 | 9 | 135 | 700 | 88 |
| 2 | | 2.0 | | | 4.2 | | | | | | | 10 | 305 | 100 | 90 |
| 3 | | 1.5 | | | | | | | | | 3.15 | 6 | 210 | 2500 | 89 |
| 4 | | 1.13 | | 0.38 | 1.06 | | 1.06 | | | | 1.06 | 2 | 210 | 180 | 88 |
| 5 | | 1.13 | | 0.38 | | 1.06 | 1.06 | | | | 1.06 | 5 | 217 | 215 | 90 |
| 6 | | 1.13 | | 0.38 | | 1.58 | | | | | 1.58 | 3 | 267 | 108 | 94 |
| 7 | | 1.5 | | | 1.5 | | | | | | 1.5 | 6 | 255 | 550 | 94 |
| 8 | | 1.13 | | 0.38 | 3.14 | | | | | | | 4 | 340 | 23 | 89 |
| 9 | 1.23* | | | 0.38 | 1.06 | | 1.06 | | | | 1.06 | 7 | 143 | 1900 | 94 |
| 10 | | | 0.75 | 0.25 | 1.4 | | | 0.7 | | | | 10 | 290 | 78 | 85 |
| 11 | | | 1 | | 0.7 | | | | 1.4 | | | 9 | 300 | 118 | 76 |
| 12 | | | 1 | | | 0.7 | | | | 1.4 | | 9 | 270 | 260 | 81 |

*Introduced as DMT = dimethyl ester of terephthalic acid

TABLE II

| | Paint formulation (weight ratios) | | | | Coating characteristic | | | | | | | | | |
|---|---|---|---|---|---|---|---|---|---|---|---|---|---|---|
| Ex. | Solid resin | Cymel 301 | Kronos RN 59 | ddbs$^{x)}$ | Stoving residu (%) | Impact (mm) | Erichsen (mm)$^{+)}$ | Bend 180° | Konig Hardness (ocs.) | Gardner Gloss 20°-60° | Levelling | Appearance | Visual Gloss | Adhesion % |
| 1 | 60 | 40 | 100 | 0.5 | 93 | 4 | 7.6 | good | 59 | 91->100 | fair | good | good | 90 |
| 2 | 60 | 40 | 100 | 0.5 | 92 | 4-5 | 6.5 | good | 75 | 90->100 | good | good | very good | 70 |
| 3 | 60 | 40 | 100 | 0.5 | 93 | >5 | 8.9 | good | 75 | 80-98 | good | few blisters | good | 95 |
| 4 | 60 | 40 | 100 | 0.5 | 91 | >5 | 8.6 | good | 83 | 83-98 | good | good | good | 90 |
| 5 | 60 | 40 | 100 | 0.5 | 92 | >5 | 8.9 | good | 78 | 83-100 | few craters | good | good | 90 |
| 6 | 60 | 40 | 100 | 0.5 | 92 | >5 | 7.7 | good | 52 | 79-92 | good | good | good | 10 |
| 7 | 60 | 40 | 100 | 0.5 | 93 | >5 | 7.6 | good | 89 | 92-98 | good | blisters | very good | 90 |
| 8 | 60 | 40 | 100 | 0.5 | 91 | >5 | 7.7 | good | 76 | 98->100 | good | good | fair | 0 |
| 9 | 60 | 40 | 100 | 0.5 | 94 | 4 | 8.1 | good | 74 | 84-97 | pinholes | good | good | 95 |
| 10 | 60 | 40 | 100 | 0.5 | 94 | 2 | 8.2 | good | 103 | 84-100 | few | good | good | 90 |

TABLE II-continued

| | Paint formulation (weight ratios) | | | | Coating characteristic | | | | | | | | | |
|---|---|---|---|---|---|---|---|---|---|---|---|---|---|---|
| Ex. | Solid resin | Cymel 301 | Kronos RN 59 | ddbs[x)] | Stoving residu (%) | Impact (mm) | Erichsen (mm)[+)] | Bend 180° | Konig Hardness (ocs.) | Gardner Gloss 20°-60° | Leveling | Appearance | Visual Gloss | Adhesion % |
| 11 | 60 | 40 | 100 | 3.5 | 90 | 1 | 6.7 | moderate | 117 | 92-99 | craters good | good | good | 95 |
| 12 | 60 | 40 | 100 | 0.5 | 92 | 2 | 7.2 | good | 107 | 93-100 | good | good | good | 90 |

[x)] dodecyl benzenesulfonic acid
[+)] slow penetration

We claim:

1. A method for preparing a polyester having an acid value below 15 and a hydroxyl value of 130-400, comprising heating and reacting a mixture consisting essentially of 75-100 equivalent percent of a phthalic acid, 0-25 equivalent percent of an aliphatic dicarboxylic acid containing 4-40 carbon atoms and 150-225 equivalent percent based on total carboxylic acid equivalents of an aliphtic diol containing 5-12 carbon atoms in the molecule.

2. A method according to claim 1 in which the diol has 5 to 12 carbon atoms in a straight chain and two primary hydroxyl groups.

3. A method according to claim 2 in which the diol contains 5-7 carbon atoms.

4. A polyester composition consisting essentially of 75-100 equivalent percent of radicals derived from a phthalic acid, 0-25 equivalent percent of an aliphatic dicarboxylic acid containing 4-40 carbon atoms and 150-225 equivalent percent based on the total carboxylic acid equivalents of an aliphatic diol containing 5-12 carbon atoms in the molecule, the polyester having an acid value below 15 and a hydroxyl value of 130-400.

5. A polyester composition according to claim 4 in which the aliphatic diol has 5 to 12 carbon atoms in a straight chain and two primary alcohol groups.

6. A polyester composition according to claim 5 in which the diol contains 5-7 carbon atoms.

7. A polyester composition according to claim 4 wherein said composition exhibits a viscosity at 20° C. below 4000 poise.

* * * * *